(12) United States Patent
Drazan

(10) Patent No.: US 8,856,044 B1
(45) Date of Patent: Oct. 7, 2014

(54) SEGMENTED ACCESS OF REMOTELY STORED BIOGRAPHICAL DATA TO A CLIENT DEVICE

(71) Applicant: Jeffrey Drazan, Woodside, CA (US)

(72) Inventor: Jeffrey Drazan, Woodside, CA (US)

( * ) Notice: Subject to any disclaimer, the term of this patent is extended or adjusted under 35 U.S.C. 154(b) by 25 days.

(21) Appl. No.: 13/849,473

(22) Filed: Mar. 23, 2013

(51) Int. Cl.
*G06F 21/00* (2013.01)
*G06Q 10/10* (2012.01)
*G06Q 20/38* (2012.01)
*H04L 29/06* (2006.01)

(52) U.S. Cl.
CPC ............ *G06Q 20/382* (2013.01); *G06Q 10/109* (2013.01); *H04L 63/10* (2013.01)
USPC .............................................. 705/50; 705/51

(58) Field of Classification Search
CPC . G06Q 30/02; G06Q 30/0241; G06Q 30/016; G06Q 30/018; G06Q 30/0207; G06Q 30/0209; G06Q 30/00; G06Q 30/0201; G06Q 30/0251; G06Q 30/0253; G06Q 30/0269; G06Q 30/0603; G06Q 30/0643; G06Q 30/08; G06Q 20/40; G06Q 20/04; G06Q 20/12; G06Q 20/363; G06Q 20/4014; G06Q 20/40145
See application file for complete search history.

(56) References Cited

U.S. PATENT DOCUMENTS

| | | |
|---|---|---|
| 5,084,769 A | 1/1992 | Miura |
| 5,483,052 A | 1/1996 | Smith, III et al. |
| 5,493,105 A | 2/1996 | Desai |
| 5,591,956 A | 1/1997 | Longacre, Jr. et al. |
| 5,604,640 A | 2/1997 | Zipf et al. |
| 5,640,565 A | 6/1997 | Dickinson |
| 5,971,277 A | 10/1999 | Cragun et al. |
| 6,012,102 A | 1/2000 | Shachar |
| 6,044,349 A | 3/2000 | Tolopka et al. |
| 6,249,765 B1 | 6/2001 | Adler et al. |
| 6,311,214 B1 | 10/2001 | Rhoads |
| 6,386,453 B1 | 5/2002 | Russell et al. |
| 6,523,116 B1 | 2/2003 | Berman |
| 6,568,596 B1 | 5/2003 | Shaw |
| 6,622,919 B1 | 9/2003 | Wilz et al. |
| 6,753,883 B2 | 6/2004 | Schena et al. |
| 6,827,273 B2 | 12/2004 | Wilz, Sr. et al. |
| 6,944,767 B1 | 9/2005 | Judson |
| 7,051,086 B2 | 5/2006 | Rhoads et al. |

(Continued)

FOREIGN PATENT DOCUMENTS

| | | |
|---|---|---|
| CN | 201732379 U | 2/2011 |
| CN | 202512588 U | 10/2012 |

(Continued)

*Primary Examiner* — Calvin L Hewitt, II
*Assistant Examiner* — Mohammad A Nilforoush
(74) *Attorney, Agent, or Firm* — Raj Abhyanker, P.C.

(57) ABSTRACT

Methods and systems of segmented access of remotely stored biographical data to a client device are disclosed. In one embodiment, a biographical information is obtained from a vocational collateral such as a business card. In this embodiment, a method and system includes extracting a biographical data from a digital identifier of the vocational collateral. The method and system includes assigning at least one of an access privilege and a security privilege to the biographical data extracted from the digital identifier. The method and system further includes storing the biographical data comprising at least one of the access privilege and the security privilege in a repository of a cloud computing environment accessible to a number of client devices through a network connection. Finally, the method and system includes permitting the number of client devices access to the biographical data based on the access privilege and/or the security privilege.

15 Claims, 9 Drawing Sheets

(56) References Cited

U.S. PATENT DOCUMENTS

| | | |
|---|---|---|
| 7,150,400 B2 | 12/2006 | Melick et al. |
| 7,343,299 B2 | 3/2008 | Algazi |
| 7,628,318 B2 | 12/2009 | Melick et al. |
| 7,738,921 B2 | 6/2010 | Silverbrook et al. |
| 7,752,318 B2 | 7/2010 | Kojima |
| 7,945,943 B2 | 5/2011 | Silverbrook et al. |
| 8,016,187 B2 | 9/2011 | Frantz et al. |
| 8,108,240 B2 | 1/2012 | Gropper |
| 8,131,262 B2 | 3/2012 | Trioano et al. |
| 8,157,173 B2 | 4/2012 | Melick et al. |
| 8,290,522 B2 | 10/2012 | Lapstun et al. |
| 8,291,082 B2 | 10/2012 | Tolson et al. |
| 8,346,532 B2 * | 1/2013 | Chakra et al. ............ 704/1 |
| 8,352,307 B2 | 1/2013 | Moukas et al. |
| 8,393,537 B2 | 3/2013 | Daigle et al. |
| 2003/0019935 A1 | 1/2003 | Giannulli |
| 2004/0200901 A1 | 10/2004 | Lebaschi et al. |
| 2005/0223389 A1 | 10/2005 | Klein et al. |
| 2006/0112014 A1 | 5/2006 | Azeem |
| 2007/0102521 A1 | 5/2007 | Petersson |
| 2007/0123167 A1 | 5/2007 | Lauper |
| 2009/0052804 A1 * | 2/2009 | Lewis .................. 382/298 |
| 2010/0010873 A1 * | 1/2010 | Moreau ................ 705/10 |
| 2010/0031173 A1 | 2/2010 | Djemal |
| 2012/0168497 A1 | 7/2012 | Yach |
| 2012/0229256 A1 | 9/2012 | Chew et al. |
| 2012/0278193 A1 | 11/2012 | Groat et al. |
| 2012/0290336 A1 | 11/2012 | Rosenblatt et al. |
| 2012/0311320 A1 | 12/2012 | Brown |
| 2012/0324242 A1 | 12/2012 | Kirsch |
| 2012/0330844 A1 | 12/2012 | Kaufman |
| 2013/0002713 A1 | 1/2013 | Souparis et al. |
| 2013/0006781 A1 | 1/2013 | Hogg et al. |
| 2013/0026232 A1 | 1/2013 | Zhou |
| 2013/0031623 A1 | 1/2013 | Sanders |
| 2013/0037607 A1 | 2/2013 | Bullwinkel |
| 2013/0040588 A1 | 2/2013 | Sturdivant et al. |
| 2013/0041823 A1 | 2/2013 | Wagner et al. |
| 2013/0043303 A1 | 2/2013 | Chen |
| 2013/0054266 A1 | 2/2013 | Oakley |
| 2013/0056535 A1 | 3/2013 | Rowlandson et al. |

FOREIGN PATENT DOCUMENTS

| | | |
|---|---|---|
| EP | 1001605 B1 | 3/2007 |
| EP | 1535121 B1 | 8/2010 |
| EP | 1234276 B1 | 11/2010 |
| KR | 20040087302 A | 10/2004 |
| TW | 201241753 A | 10/2012 |
| WO | 2006023715 A2 | 3/2006 |
| WO | 2006112866 A3 | 2/2007 |
| WO | 2012142882 A1 | 10/2012 |
| WO | 2013019216 A1 | 2/2013 |

\* cited by examiner

| | NAME 400 | JOB TITLE 402 | CONTACT INFORMATION 404 | SALARY 406 | EMPLOYER DESCRIPTION 408 | EDUCATION HISTORY 410 | TECHNICAL KNOWLEDGE 412 |
|---|---|---|---|---|---|---|---|
| 1. | J. DOE | VICE PRESIDENT | 555-555-5555 J.DOE@ACMEWHEEL.COM 123 STREET, CITYTOWN, CA | $100,000.00 | FORTUNE 1000 | COLLEGE A GRAD SCHOOL B | CAD DESIGN MICROSOFT* OFFICE |
| ACCESS PRIVILEGE 300 | FREE | PAID STANDARD | PAID STANDARD | PAID PREMIUM | FREE | PAID STANDARD | PAID PREMIUM |
| SECURITY PRIVILEGE 302 | LOW SENSITIVITY | MEDIUM SENSITIVITY | MEDIUM SENSITIVITY | HIGH SENSITIVITY | LOW SENSITIVITY | MEDIUM SENSITIVITY | HIGH SENSITIVITY |
| 2. | A. WATER | CHEF | 510-555-5555 A.WATER@CHEZP.COM 214 STREET, BERK, CA | $40,000.00 | PRIVATE RESTAURANT | CULINARY SCHOOL A | CALIFORNIA CUISINE |
| ACCESS PRIVILEGE 300 | FREE | FREE | FREE | PAID STANDARD | FREE | FREE | FREE |
| SECURITY PRIVILEGE 302 | LOW SENSITIVITY | LOW SENSITIVITY | LOW SENSITIVITY | MEDIUM SENSITIVITY | LOW SENSITIVITY | LOW SENSITIVITY | LOW SENSITIVITY |
| 3. | B. GATE | PROG- RAMMER | 425-555-5555 B.GATE@MSOFT.COM 111 STREET, TOWN, WA | $50,000.00 | FORTUNE 100 | HIGH SCHOOL | C# PYTHON JAVA |
| ACCESS PRIVILEGE 300 | LOW SENSITIVITY | LOW SENSITIVITY | LOW SENSITIVITY | MEDIUM SENSITIVITY | LOW SENSITIVITY | MEDIUM SENSITIVITY | MEDIUM SENSITIVITY |
| SECURITY PRIVILEGE 302 | FREE | FREE | FREE | PAID STANDARD | FREE | PAID STANDARD | PAID STANDARD |
| • • • | • • • | • • • | • • • | • • • | • • • | • • • | • • • |
| N. | E. SMITH | LOBBYIST | 202-555-5555 E.SMITH@KSTREET.COM 342 STREET, CITY, VA | $400,000.00 | CONSULTANCY | COLLEGE D BUSINESS SCHOOL E | HEALTHCARE LOBBYING OIL AND GAS LOBBYING |
| ACCESS PRIVILEGE 300 | LOW SENSITIVITY | LOW SENSITIVITY | LOW SENSITIVITY | HIGH SENSITIVITY | LOW SENSITIVITY | MEDIUM SENSITIVITY | MEDIUM SENSITIVITY |
| SECURITY PRIVILEGE 302 | FREE | FREE | FREE | PAID PREMIUM | FREE | PAID PREMIUM | PAID PREMIUM |

FIGURE 4

SEGMENTED ACCESS OF REMOTELY STORED BIOGRAPHICAL DATA TO A CLIENT DEVICE

FIELD OF TECHNOLOGY

This disclosure relates generally to segmented access of remotely stored biographical data to a client device. In one example embodiment, to a method of extracting biographical data from a digital identifier of a vocational collateral, such as a business card, and assigning an access privilege to the vocational collateral.

BACKGROUND

A business card is a type of vocational collateral bearing information concerning an individual or a company indicated on the business card. The business card may be exchanged when one individual meets another individual in the context of a face-to-face meeting. The business card may be printed with black text on a small white card and/or may include a visual marker (e.g., a logo of an organization).

A text on the business card may be printed in small and hard to read font sizes. Such constraints may adversely affect an individual's ability to recognize and/or recall information on the business card. For example, the individual may be in a meeting or on a conference call and may need to reference a phone and/or an email address of a contact in a timely fashion. This individual may pull out the business card of the contact but may have difficulties reading the phone number and/or the email address listed on the business card. Moreover, the individual may have to shuffle through a stack of business cards just to locate the relevant business card. Worse yet, the individual may have lost the business card of the contact or may have left the business card in a different article of clothing. As such, the individual may never form and/or fortify a relationship with the contact. As such, the individual's productivity may decline and the organization employing the individual may lose money because of a lost opportunity.

SUMMARY

Methods and systems of segmented access of remotely stored biographical data to a client device are disclosed. In one aspect, a method includes extracting a biographical data from a digital identifier of a vocational collateral. In this aspect, the digital identifier is at least one of a quick response (QR) code, a scan code, a bar code, a graphic code, and a matrix code. The method also includes assigning at least one of an access privilege and a security privilege to the biographical data extracted from the digital identifier through an assignment module. The method further includes storing the biographical data having at least one of the access privilege and the security privilege in a repository of a cloud computing environment accessible to a plurality of client devices through a network connection. Finally, the method includes permitting the plurality of client devices access to the biographical data based on at least one of the access privilege and the security privilege.

In this aspect, the biographical data may comprise a name, a job title, a contact information, an employer description, a salary, an education history, a technical knowledge, a personal picture, an employment history, and/or a job-related data of an owner of the vocational collateral. The method may also include recognizing the digital identifier using an optical capture device when extracting the biographical data from the digital identifier of the vocational collateral. In this aspect, the optical capture device may be a smartphone, a mobile telephone, a thin-client device, a QR code scanner, a bar code scanner, and/or a web camera.

Furthermore, the method may include storing the biographical data having at least the access privilege and/or the security privilege in a repository of a local computing environment. The method may also include assigning the access privilege to the biographical data based on a monetary value of the biographical data calculated using a valuing module. The security privilege may also be assigned based on a sensitivity of the biographical data. In this aspect, the access privilege and the security privilege may also be assigned based on a criteria established by a third-party administrator.

The method may further include generating a client interface portal through a portal interface module to allow a client device access to the biographical data and/or an additional biographical data stored in the repository. In this aspect, the client interface portal may be a web-based portal, a server portal, and/or a mobile application portal. The method may also include translating a textual data of the vocational collateral from a language other than the English language to a translated data that is the English language equivalent of the textual data.

In another aspect, a method includes capturing a visual pattern of the vocational collateral using an optical capture device; encoding the visual pattern of the vocational collateral into a coded proxy of the vocational collateral; creating a placeholder object associated with the coded proxy; storing the coded proxy and its associated placeholder object in a repository of a cloud computing environment accessible to a plurality of client devices through a network connection; permitting an owner of the vocational collateral to populate the placeholder object with a submitted biographical data; assigning at least one of an access privilege and a security privilege to the submitted biographical data through an assignment module; and permitting the plurality of client devices access to the submitted biographical data based on at least one of the access privilege and the security privilege.

The method may also include matching the coded proxy with the visual pattern of the vocational collateral when the visual pattern of the vocational collateral is captured again by the optical capture device. In this aspect, the optical capture device may be a smartphone, a mobile telephone, a thin-client device, a QR code scanner, a bar code scanner, and/or a web camera.

The method may also include storing the submitted biographical data having at least one of the access privilege and the security privilege in a repository of a local computing environment. In this aspect, the submitted biographical data may comprise a name, a job title, a contact information, an employer description, a salary, an education history, a technical knowledge, a personal picture, an employment history, and/or a job-related data of an owner of the vocational collateral The method may also include assigning the access privilege to the submitted biographical data based on a monetary value of the submitted biographical data calculated using a valuing module. The security privilege may also be assigned based on a sensitivity of the submitted biographical data. The access privilege and the security privilege may also be assigned based on a criteria established by a third-party administrator.

The method may also include generating a client interface portal through a portal interface module to allow a client device access to the submitted biographical data and an additional submitted biographical data stored in the repository. In this aspect, the client interface portal may be one of a web-based portal, a server portal, and/or a mobile application portal. Finally, the method may also include translating a textual data of the vocational collateral from a language other than the English language to a translated data that is the English language equivalent of the textual data through a translation module.

The methods disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and are not limited to the figures of the accompanying drawings, in which, like references indicate similar elements.

FIG. 4 is a table view of an access privilege and a security privilege being assigned to data stored in the repository of FIG. 1, according to one embodiment.

Other features of the present embodiments will be apparent from the accompanying drawings and from the detailed description that follows.

DETAILED DESCRIPTION

Methods and systems of segmented access of remotely stored biographical data to a client device are disclosed. Example embodiments, as described below, may be used to provide several methods to obtain and store biographical information from a vocational collateral such as a business card. Although the present embodiments have been described with reference to specific example embodiments, it will be evident that various modifications and changes may be made to these embodiments without departing from the broader spirit and scope of the various embodiments.

Figure 1:
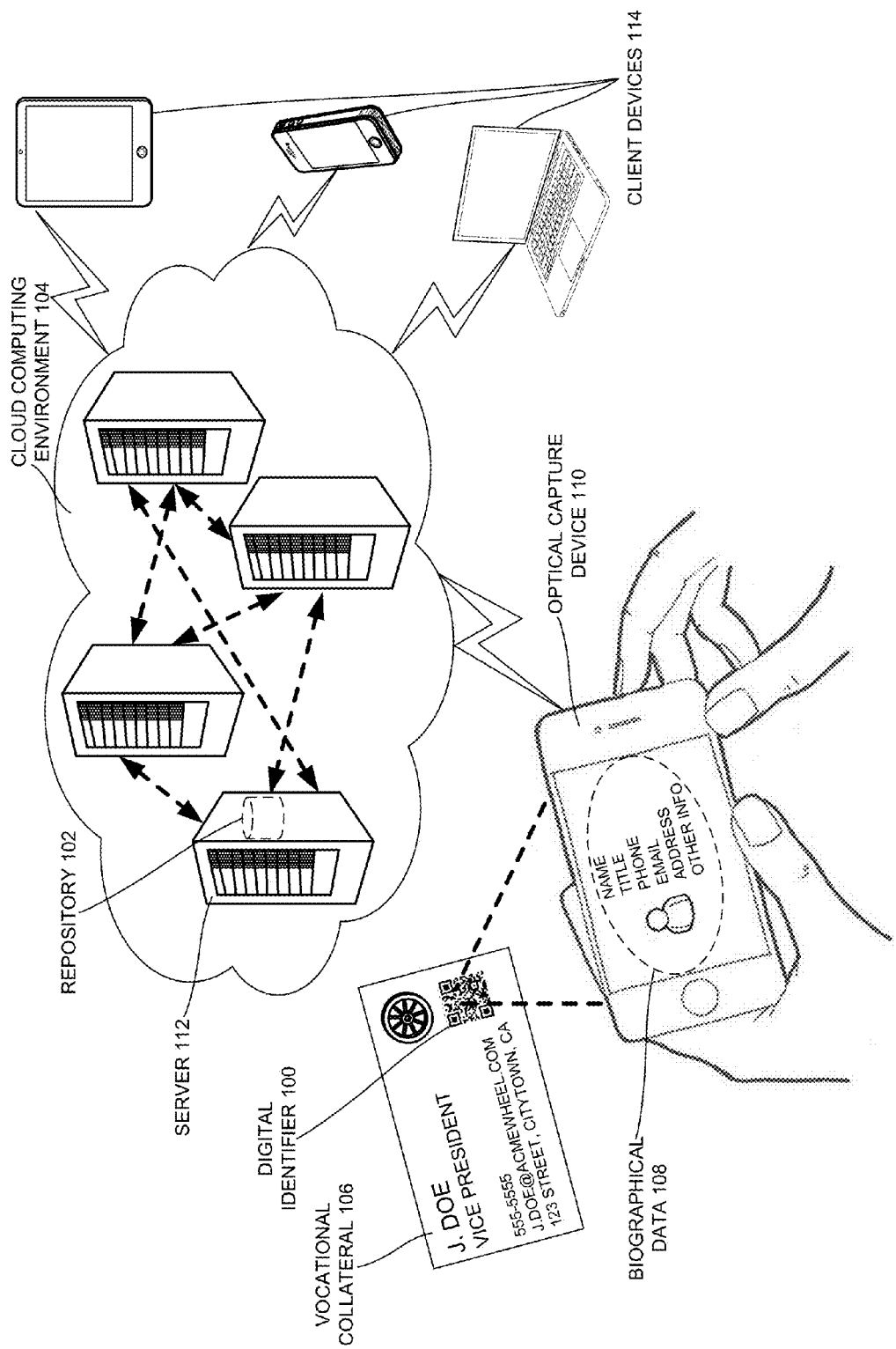
FIG. 1 illustrates an optical capture device extracting data from a digital identifier of a vocational collateral and storing the data in a repository of a cloud computing environment, according to one embodiment.

Reference is now made to FIG. 1, which illustrates an optical capture device 110 extracting a biographical data 108 from a digital identifier 100 of a vocational collateral 106 and storing the biographical data 108 in a repository 102 of a cloud computing environment 104, according to one or more embodiments. In one embodiment, a method includes extracting the biographical data 108 from the digital identifier 100 of the vocational collateral 106. The method may include extracting the biographical data 108 from the digital identifier 100 of the vocational collateral 106 by recognizing the digital identifier 100 using the optical capture device 110.

Figure 6:
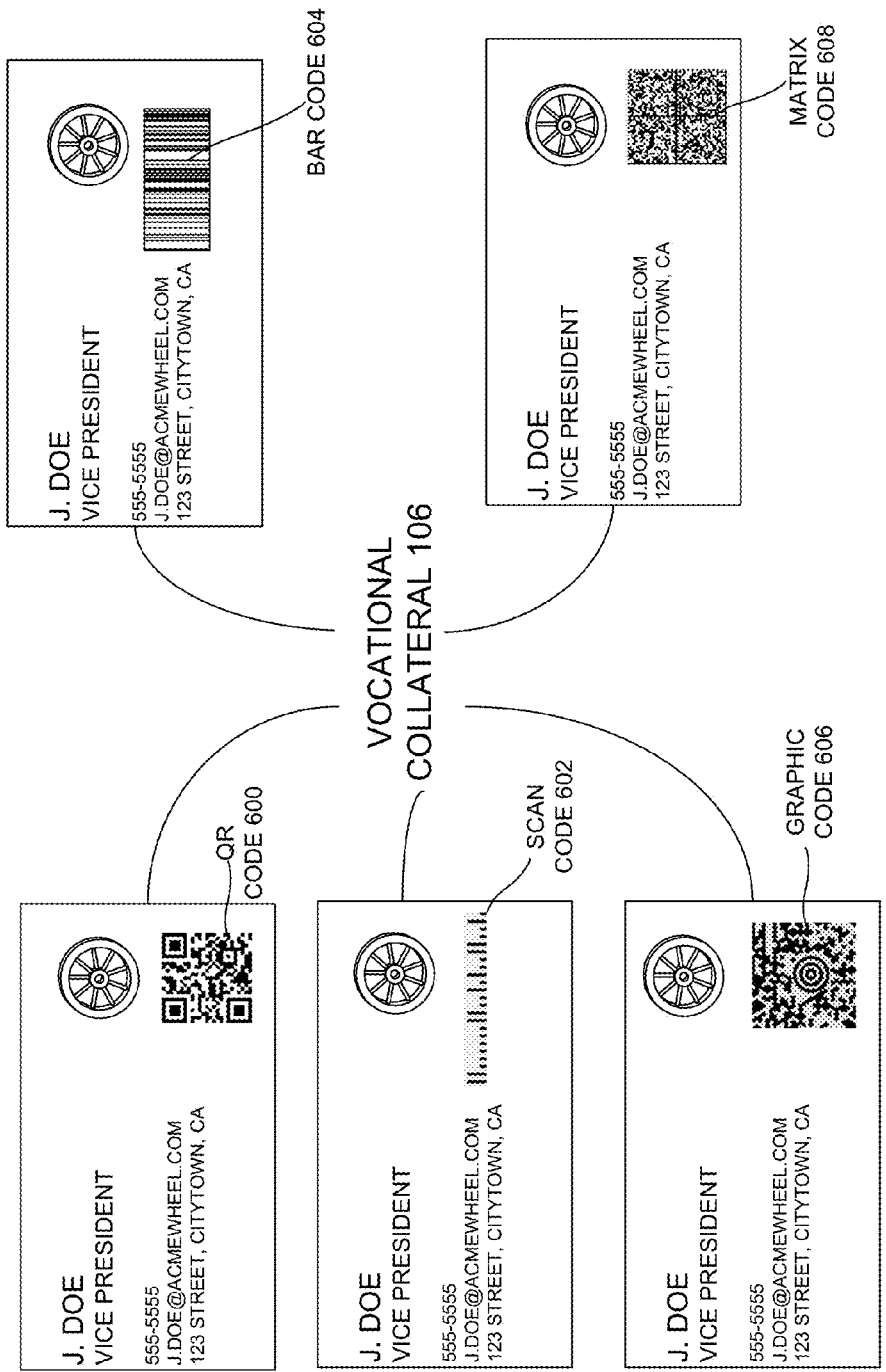
FIG. 6 illustrates the various types of digital identifiers that can be used as the digital identifier of FIG. 1, according to one embodiment.

In one or more embodiments, the digital identifier 100 is at least one of a quick response (QR) code 600 (see FIG. 6), a scan code 602 (see FIG. 6), a bar code 604 (see FIG. 6), a graphic code 606 (see FIG. 6), and a matrix code 608 (see FIG. 6). In one or more embodiments, the vocational collateral 106 may comprise a business card, a contact card, a resume, a cover letter, and/or a business related collateral.

In one or more embodiments, the optical capture device 110 may be at least one of a smartphone, a tablet device, a mobile telephone, a thin-client device, a QR code scanner, a bar code scanner, and a web camera. More specifically, the smartphone may be at least one of an Android® compatible smartphone, an iOS® compatible smartphone, and/or a Windows® compatible smartphone comprising a light-emitting element and at least one of a charge-coupled device (CCD) camera sensor and a complementary metal-oxide semiconductor (CMOS) camera sensor. The mobile telephone may be an Android® compatible mobile telephone, an iOS® compatible mobile telephone, and/or a Windows® compatible mobile telephone comprising a light-emitting element and at least one of a charge-coupled device (CCD) camera sensor and a complementary metal-oxide semiconductor (CMOS) camera sensor. Moreover, the tablet device may be an Android® compatible tablet device, an iOS® compatible tablet device, and/or a Windows® compatible tablet device comprising at least one of a CCD camera sensor and/or a CMOS camera sensor.

In one embodiment, the optical capture device 110 may extract the biographical data 108 from the digital identifier 100 by illuminating the digital identifier 100 using a light-emitting element of the optical capture device 110. The optical capture device 110 may then measure the amount of reflected light through at least one of the CCD camera sensor and the CMOS camera sensor. The light waveforms may then be converted from an analog form to a digital form, which may then be decoded by a decoding application into a decoded data. In one embodiment, the decoding application may be resident in the optical capture device 110. In another embodiment, the decoding application may be resident in the server 112 of the cloud computing environment 104.

In one embodiment, the decoded data may be the biographical data 108. In another embodiment, the decoded data may be a uniform resource locator (URL) address that directs a web browser application of the optical capture device 110 to retrieve a webpage comprising the biographical data 108. In yet another embodiment, the decoded data may be a URL address that directs a mobile application of the optical capture device 110 to retrieve the biographical data 108 from the repository 102 of the cloud computing environment 104 and/or another repository resident on a cloud computing environment. In this embodiment, the optical capture device 110 may then send the biographical data 108 to the repository 102 of the cloud computing environment 104. The biographical data 108 may be sent to the repository 102 of the cloud computing environment 104 through a wireless and/or wired network connection.

The wireless network connection may comprise the bi-directional transference of data through at least a portion of a Personal Communication Service (PCS) frequency standard, a Wireless Broadband (WiBro) standard, a Worldwide Interoperability for Microwave Access (WiMAX) standard, a 4GPP Long Term Evolution (LTE) standard, an Ultra Mobile Broadband (UMB) standard, a High Capacity Spatial Division Multiple Access (HC-SDMA) standard, a High Speed OFDM Packet Access (HSOPA), a Generic Access Network (GAN), a Time Division-Code Division Multiple Access (TD-CDMA) standard, a Freedom of Mobile Multimedia Access (FOMA) standard, a Universal Mobile Telecommunications System (UMTS), a Wideband Code Division Multiple Access (W-CDMA) standard, an Enhanced Data Rates for GSM Evolution (EDGE) standard, a Code Division Multiple Access-2000 (CDMA2000) standard, a General Packet Radio Service (GPRS) standard, a Global System for Mobile Communications (GSM) standard, and any other radiofrequency standard that may be used to effect the disclosed embodiments.

In addition, the wireless network connection may comprise the bi-directional transference of data through at least a portion of a wireless wide-area network (WWAN) connection, a satellite network connection, an optical or infrared connection, a near-field communication connection, and a wireless connection abiding by the rules of the Institute of Electrical and Electronics Engineers (IEEE) Standard 802.11. Furthermore, the wired network connection may comprise the bi-directional transference of data through at least a portion of a local-area network (LAN) connection, a wide-area network (WAN) connection, a cable high-speed connection, and/or a fiber optic connection.

In one embodiment, the biographical data 108 is stored in the repository 102 of the cloud computing environment 104. In this embodiment, the repository 102 may refer to a non-volatile memory resident in at least one of the server 112 and another server in the cloud computing environment 104. In another embodiment, the repository 102 may refer to a database stored in the non-volatile memory resident in at least one of the server 112 and another server in the cloud computing environment 104. In yet another embodiment, the repository 102 may refer to a file path in the sever 112 and/or a file path in another server in the cloud computing environment 104 that can be used to access the data stored in at least one of a database, a memory, and a storage of a server in the cloud computing environment 104. While FIG. 1 illustrates the repository 102 being resident in the server 112, it may be possible for any of the other servers depicted in FIG. 1 to contain the repository 102 and for any of the servers depicted in FIG. 1 to be the server 112.

In addition, FIG. 1 depicts the cloud computing environment 104 comprising four servers coupled to one another with one of the servers being the server 112 containing the repository 102. However, in practice, the cloud computing environment 104 may comprise a multitude of servers ranging from four (4), to five (5) to six (6) . . . to N number of servers. Moreover, the number of client devices 114 may be more or fewer than the number of client devices 114 illustrated in FIG. 1. In one or more embodiments, each of the client devices 114 may be at least one of a smartphone, a mobile telephone, a tablet device, a laptop computer, a desktop computer, and any other thin- or thick-client device. Finally, in keeping with the tenets of cloud computing, the cloud computing environment 104 may divide up at least one of a processing function, a storage function, a memory function, and/or a networking connection function to one or more of the servers comprising the cloud computing environment 104. Such functions may be rapidly assigned and re-assigned based on the demands of the client devices served. Moreover, while the servers in FIG. 1 (including the server 112) are shown as separate entities, it may be possible for one or more of the servers to implement commands as a single server for purposes of optimizing available resources. In addition, it may be possible for one server to act as a conduit between two or more servers.

In one embodiment, the cloud computing environment 104 may be a public cloud computing environment where the cloud infrastructure may be shared by multiple providers and/or organizations and supports the needs of those providers. In another embodiment, the cloud computing environment 104 may be a private cloud environment where the cloud infrastructure may be operated solely for the benefit of one organization. In yet another embodiment, the cloud computing environment 104 may be a hybrid cloud computing environment where multiple cloud computing environments may be bound together by standard protocols that enable data and/or application portability.

In a further embodiment, the cloud computing environment 104 may be a cloud computing environment offered as part of a cloud platform-as-a-service (PaaS) (Amazon® Elastic Compute Cloud (ECM) or Oracle® PaaS). In this embodiment, the cloud computing environment 104 may be maintained by the service provider while the applications and/or modules used to implement the various embodiments may be deployed in the cloud computer environment 104.

Figure 3:
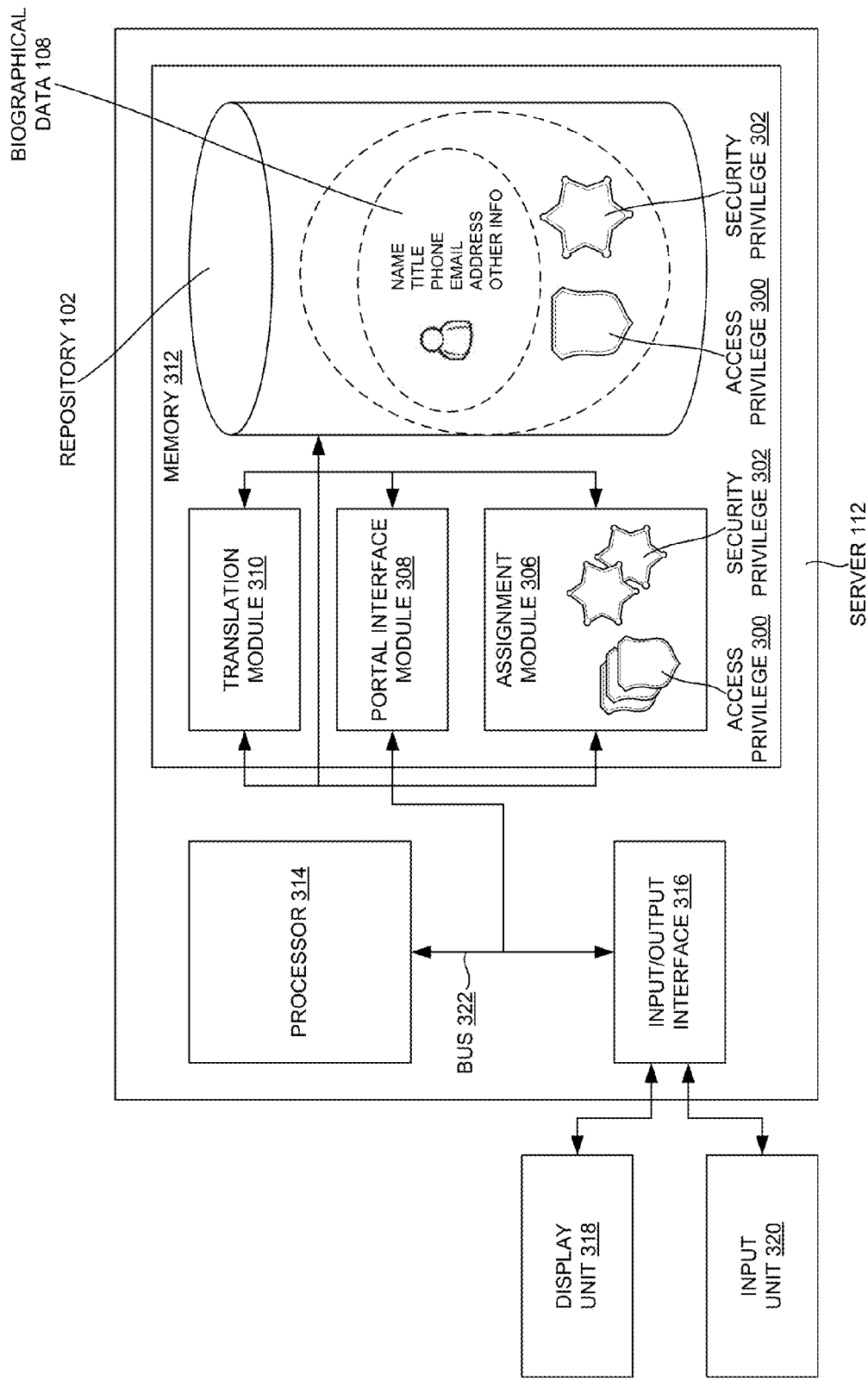
FIG. 3 illustrates a block diagram of a server in the cloud computing environment of FIGS. 1 and 2, according to one embodiment.

In one embodiment, the method also includes assigning at least one of an access privilege 300 and a security privilege 302 (see FIG. 3) to the biographical data 108 extracted from the digital identifier 100 through an assignment module 306 (see FIG. 3). As depicted in FIG. 3, the assignment module 306 may be stored in a memory of the server 112 and/may be written into the memory of the server 112 prior to execution by a processor of the server 112. The method further includes storing the biographical data 108 having at least one of the access privilege 300 and the security privilege 302 in the repository 102 of the cloud computing environment 104 accessible to the plurality of client devices 114 through the network connection described heretofore. Finally, the method includes permitting the plurality of client devices 114 access to the biographical data 108 based on at least one of the access privilege 300 and the security privilege 302 assigned.

In one or more embodiments, the biographical data 108 may comprise a name 400 (see FIG. 4), a job title 402 (see FIG. 4), a contact information 404 (see FIG. 4), a salary 406 (see FIG. 4), an employer description 408 (see FIG. 4), an education history 410 (see FIG. 4), a technical knowledge 412 (see FIG. 4), a personal picture, an employment history, and/or a job-related data of an owner of the vocational collateral 106.

In an additional embodiment, the server 112 may send an electronic message to the owner of the vocational collateral 106 to ask the owner to submit additional biographical information not present in the vocational collateral 106. Such additional biographical information may comprise at least one of a salary 406 (see FIG. 4), an employer description 408 (see FIG. 4), an education history 410 (see FIG. 4), and a technical knowledge 412 (see FIG. 4).

Figure 2:
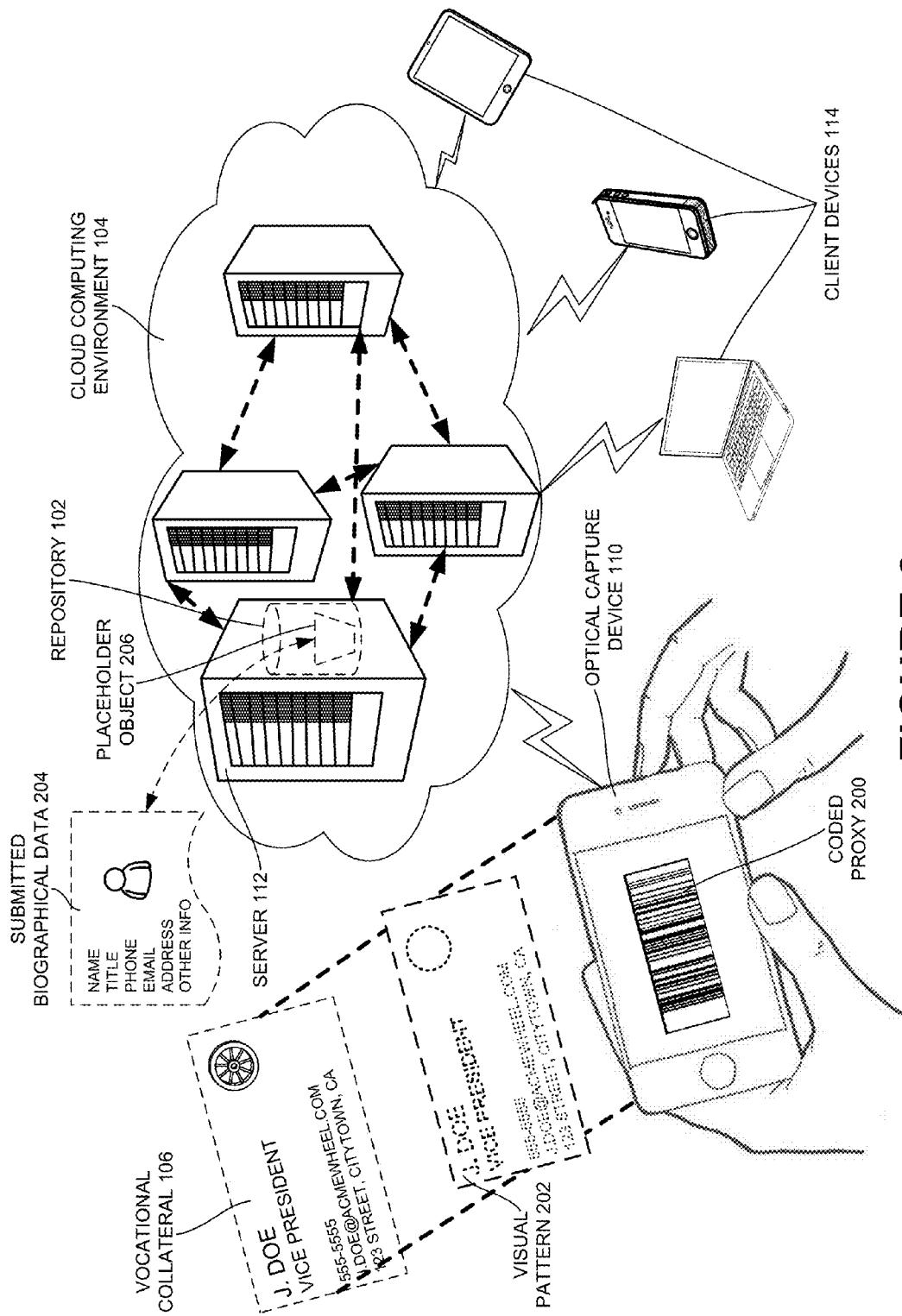
FIG. 2 illustrates an optical capture device capturing a visual pattern of a vocational collateral and storing the information in a repository of a cloud computing environment, according to one embodiment.

Reference is now made to FIG. 2, which illustrates the optical capture device 110 capturing a visual pattern 202 of the vocational collateral 106 and storing the information in the repository 102 of the cloud computing environment 104, according to one or more embodiments.

In one embodiment, a method includes capturing the visual pattern 202 of the vocational collateral 106 using the optical capture device 110. In this embodiment, the visual pattern 202 may be a shape outline of the printed material on the vocational collateral 106. For example, the visual pattern 202 of a business card may be the rectangular outline of the business card along with an outline of any text and/or designs printed on the face of the business card. In this embodiment, the optical capture device 110 may capture the visual pattern 202 of the vocational collateral 106 by illuminating the vocational collateral 106 using the optical capture device 110's light-emitting element. The optical capture device 110 may then measure the amount of light reflected off of the vocational collateral 106 through at least one of the optical capture device 110's CCD camera sensor and CMOS camera sensor. The light pattern captured by the camera sensor may be the visual pattern 202.

In this embodiment, the method also involves encoding the visual pattern 202 of the vocational collateral 106 into a coded proxy 200. This may be done by converting the analog light pattern captured by the camera sensor into a digital signal correlated with the analog light pattern. In one embodiment, this digital signal is the coded proxy 200. The coded proxy 200 may also be converted into a bar code, a scan code, a matrix code, a QR code, a graphic code, and/or an alphanumeric code. The optical capture device 110 may then send the coded proxy 200 to the repository 102 of the cloud computing environment 104 through the wired and/or wireless connection described heretofore.

In this embodiment, the method also involves the server 112 of the cloud computing environment 104 creating a placeholder object 206 associated with the coded proxy 200. The server 112 then stores the coded proxy 200 and its associated placeholder object 206 in the repository 102 of the cloud computing environment 104. The placeholder object 206 may comprise at least one of a parameter marker, an empty data field, an empty table field, and an empty data object of a database stored in the repository 102 of the cloud computing environment 104. The plurality of client devices 114 may also access the cloud computing environment 104 through the wireless and/or wired network described heretofore.

In this embodiment, the method also involves permitting an owner of the vocational collateral 106 to populate the placeholder object 206 with a submitted biographical data 204. The submitted biographical data 204 may comprise a name 400 (see FIG. 4), a job title 402 (see FIG. 4), a contact information 404 (see FIG. 4), a salary 406 (see FIG. 4), an employer description 408 (see FIG. 4), an education history 410 (see FIG. 4), a technical knowledge 412 (see FIG. 4), a personal picture, an employment history, and/or a job-related data of an owner of the vocational collateral 106.

An owner of the vocational collateral 106 may populate the placeholder object 206 with the submitted biographical data 204 by inputting a set of biographical information into a user-interface portal generated by the server 112. In one embodiment, the user-interface portal may be presented as a web portal, a web browser, a mobile application, an administration portal, and/or a server portal. In another embodiment, the user-interface portal may be the client interface portal 500 depicted in FIG. 5. The owner of the vocational collateral 106 may input the submitted biographical data 204 when prompted to do so by an electronic message generated by the server 112. The electronic message may inform the owner of the vocational collateral 106 that a visual pattern 202 of the owner's vocational collateral (e.g., business card) has been entered into the repository 102 and that additional information may be required to associate the vocational collateral 106 with the owner.

In this embodiment, the method also includes assigning at least one of an access privilege 300 and a security privilege 302 (see FIG. 3) to the submitted biographical data 204 through an assignment module 306 (see FIG. 3) and permitting the plurality of client devices 114 access to the submitted biographical data 204 based on at least one of the access privilege 300 and the security privilege 302 assigned (see FIG. 3). As depicted in FIG. 3, the assignment module 306 may be stored in a memory of the server 112 and may be written into the memory of the server 112 prior to execution by a processor of the server 112.

Finally, the method may include matching the coded proxy 200 with the visual pattern 202 of the vocational collateral 106 when the visual pattern 202 of the vocational collateral 106 is captured again by the optical capture device 110. This matching may be accomplished by a matching algorithm that compares the stored coded proxy 200 with a visual pattern captured.

Reference is now made to FIG. 3, which is a block diagram of the server 112 in the cloud computing environment 104 of FIGS. 1 and 2, according to one or more embodiments. Such a diagram is only one exemplary depiction of the server 112 and is not intended to suggest any limitations as to the use and functional layout of the server. As discussed above, the server 112 may be any of the servers depicted in the cloud computing environment 104 of FIG. 1 and/or FIG. 2. The methods disclosed herein may be implemented as machine-executable instructions presented as program modules being executed by a processor of the machine. Generally, program modules include routines, programs, objects, components, logic, and/or data structures that perform particular tasks or carry out particular abstract data types.

In one embodiment, the server 112 comprises a memory 312, a processor 314, an input/output interface 316, all coupled by a bus 322. In particular, the memory 312 may comprise an assignment module 306, a portal interface module 308, a translation module 310, and the repository 102. The server 112 may also communicate with one or more external devices including a display unit 318 and an input unit 320, both of which may be interfaced with the server 112 through the input/output interface 316.

In one embodiment, the translation module 310 may translate a textual data of the vocational collateral 106 from a language other than the English language to a translated data that is the English language equivalent of the textual data. The translation module 310 may translate the textual data by delivering the textual data to a third-party server comprising a translation application programming interface (API) (e.g., Google® Translate API) and calling the results of such a translation into a memory of the server 112.

In this embodiment, the assignment module 306 may assign an access privilege 300 and a security privilege 302 to the biographical data 108 stored in the repository 102. While the access privilege 300 and the security privilege 302 are depicted as abstract representations in FIG. 3, it is understood that the access privilege 300 and the security privilege 302 may comprise any of a meta-data assigned to the biographical data 108 (to indicate an access level and/or a security level for the biographical data 108), an attribute of a data field associated with the biographical data 108, an extended attribute of a data field associated with the biographical data 108, a permission level of a data field associated with the biographical data 108, a certificate of a data field associated with the biographical data 108, an attribute of a data object associated with the biographical data 108, an extended attribute of a data object associated with the biographical data 108, a permission level of a data object associated with the biographical data 108, and/or a certificate of a data object associated with the biographical data 108.

Moreover, the assignment of the access privilege 300 and the security privilege 302 may be implemented through a number of server-side programming languages, including, but not limited to: PHP, ASP.NET, Ruby, Perl, Python, Cold-Fusion Markup Language, and/or Java.

In an additional embodiment, the assignment module 306 may also assign an access privilege 300 and a security privilege 302 to the submitted biographical data 204 stored in the repository 102 (not show in FIG. 3). Similarly, the access privilege 300 and the security privilege 302 may comprise any of a meta-data assigned to the submitted biographical data 204 (to indicate an access level and/or a security level for the submitted biographical data 204), an attribute of a data field associated with the submitted biographical data 204, an extended attribute of a data field associated with the submitted biographical data 204, a permission level of a data field associated with the submitted biographical data 204, a certificate of a data field associated with the submitted biographical data 204, an attribute of a data object associated with the submitted biographical data 204, an extended attribute of a data object associated with the submitted biographical data 204, a permission level of a data object associated with the submitted biographical data 204, and/or a certificate of a data object associated with the submitted biographical data 204.

Furthermore, the method may include assigning the access privilege 300 to the biographical data 108 based on a monetary value of the biographical data 108 calculated using a valuing module (not shown in FIG. 3) and assigning the security privilege 302 based on a sensitivity of the biographical data 108 (see FIG. 4). In this embodiment, the access privilege 300 may also be assigned based on a criteria established by a third-party administrator 502 (see FIG. 5) and the security privilege 302 may be assigned based on a sensitivity of the biographical data 108 (see FIG. 4).

Reference is now made to FIG. 4, which is a table view of the biographical data 108 stored in the repository 102 of the cloud computing environment 104 of FIG. 1, according to one or more embodiments. In one or more embodiments, the table includes data fields for the following entries: a name 400, a job title 402, a contact information 404, a salary 406, an employer description 408, an education history 410, and a technical knowledge 412.

In one embodiment, the biographical data 108 may comprise an individual by the name of J. Doe who is the Vice President of Acme Wheel Company and has a contact information as listed in the table. In this embodiment, J. Doe has a salary of $100,000.00 and works for a Fortune® 1000 company. In this embodiment, the assignment module 306 may assign the access privilege 300 of "free" to J. Doe's name and the access privilege of "paid standard" to J. Doe's job title 402. The assignment module 306 may also assign the access privilege of "paid standard" to the contact information. Moreover, the assignment module 306 may assign an access privilege of "paid premium" to J. Doe's salary of $100,000.00. Finally, the assignment module 306 may assigns access privileges of "free," "paid standard," and "paid premium" to information concerning J. Doe's employer description 408, education history 410, and technical knowledge 412.

In this embodiment, an access privilege of "free" denotes that at least one of the client devices 114 can access the information stored in that particular data field for free. An access privilege of "paid standard" denotes that at least one of the client devices 114 can access the information stored in that particular data field for a standard price and an access privilege of "paid premium" denotes that at least one of the client devices 114 can access the information stored in that particular data field for a premium price.

In one or more embodiments, the access privilege 300 is assigned based on an access algorithm of a valuing module that may be a part of the assignment module 306 and may be stored in a memory of the server 112 or read into the memory of the server 112. The access algorithm may assign a designated weight value to at least one of the name 400, the job title 402, salary 406, the employer description 408, the education history 410, and the technical knowledge 412. The access algorithm may take into account the designated weight value and calculate the access privilege 300 based on a weighted average of the designated weight value assigned to one or more combinations of the name 400, the job title 402, the salary 406, the employer description 408, the education history 410, and the technical knowledge 412.

In this embodiment, the assignment module 306 may also assign a security privilege 302 of "low sensitivity" to J. Doe's name, a security privilege of "medium sensitivity" to J. Doe's job title, a security privilege of "medium sensitivity" to J. Doe's contact information, a security privilege of "high sensitivity" to J. Doe's salary, a security privilege of "low sensitivity" to J. Doe's employer description, a security privilege of "medium sensitivity" to J. Doe's education history 410, and a security privilege of "high sensitivity" to J. Doe's technical knowledge 412.

In this embodiment, a security privilege of "low sensitivity" denotes that the information stored in that particular data field is not sensitive and/or is likely public knowledge. It may also denote that at least one of the client devices 114 can access the information stored in that particular data field without restrictions and/or having to satisfy low-level data and/or network security requirements. A security privilege of "medium sensitivity" denotes that the information stored in that particular data field is somewhat sensitive and/or is not public knowledge. It may also denote that at least one of the client devices 114 can access the information stored in that particular data field with limited restrictions and/or have to satisfy mid-level data and/or network security requirements. A security privilege of "high sensitivity" denoted that the information stored in that particular data filed is extremely sensitive and is not public knowledge. It may also denote that at least one of the client devices 114 can access the information stored in that particular data field only after satisfying high-level data and/or network security requirements.

In one or more embodiments, the security privilege 302 is assigned based on a data sensitivity algorithm that may be a part of the assignment module 306 and may be stored in a memory of the server 112 or read into the memory of the server 112. The data sensitivity algorithm may assign a sensitivity weight value to at least one of the name 400, the job title 402, salary 406, the employer description 408, the education history 410, and the technical knowledge 412. The data sensitivity algorithm may take into account the sensitivity weight value and calculate the security privilege 302 based on a weighted average of the sensitivity weight value assigned to one or a combination of the name 400, the job title 402, the salary 406, the employer description 408, the education history 410, and the technical knowledge 412.

The access algorithm and the data sensitivity algorithm may assign different weighted values to data contained in the same data field (e.g., job title 402, salary 406, employer description 408, etc.) based on a ranking factor that ranks the information contained in such data fields. For example, the biographical data 108 may comprise an individual by the name of A. Water who is a chef at Chez P. Restaurant and may include contact information as listed in the table. In this embodiment, A. Water has a salary of $40,000.00, works for a private restaurant, and has the educational background and technical knowledge indicated in the table. In this example embodiment, the assignment module 306 may assign the access privilege of "free" to A. Water's name and the access privilege of "free" to Water's job title of chef. This may be the case even though the assignment module 306 may have assigned an access privilege of "paid standard" to J. Doe's job title. This difference in assignments may be a result of the ranking factor ranking J. Doe's biographical information as more important than A. Water's biographical information. Other exemplary biographical data entries are also presented in the table in FIG. 4.

In yet another embodiment, the set of biographical data in the table may be segmented by a plurality of user accounts. A user gaining access to the repository 102 through one of the client devices 114 may only see vocational collateral that the user has personally inputted into the repository 102. In this embodiment, all of the biographical data 108 stored in the repository 102 may be stored in separate accounts, where each account is associated with a unique user.

Figure 5:
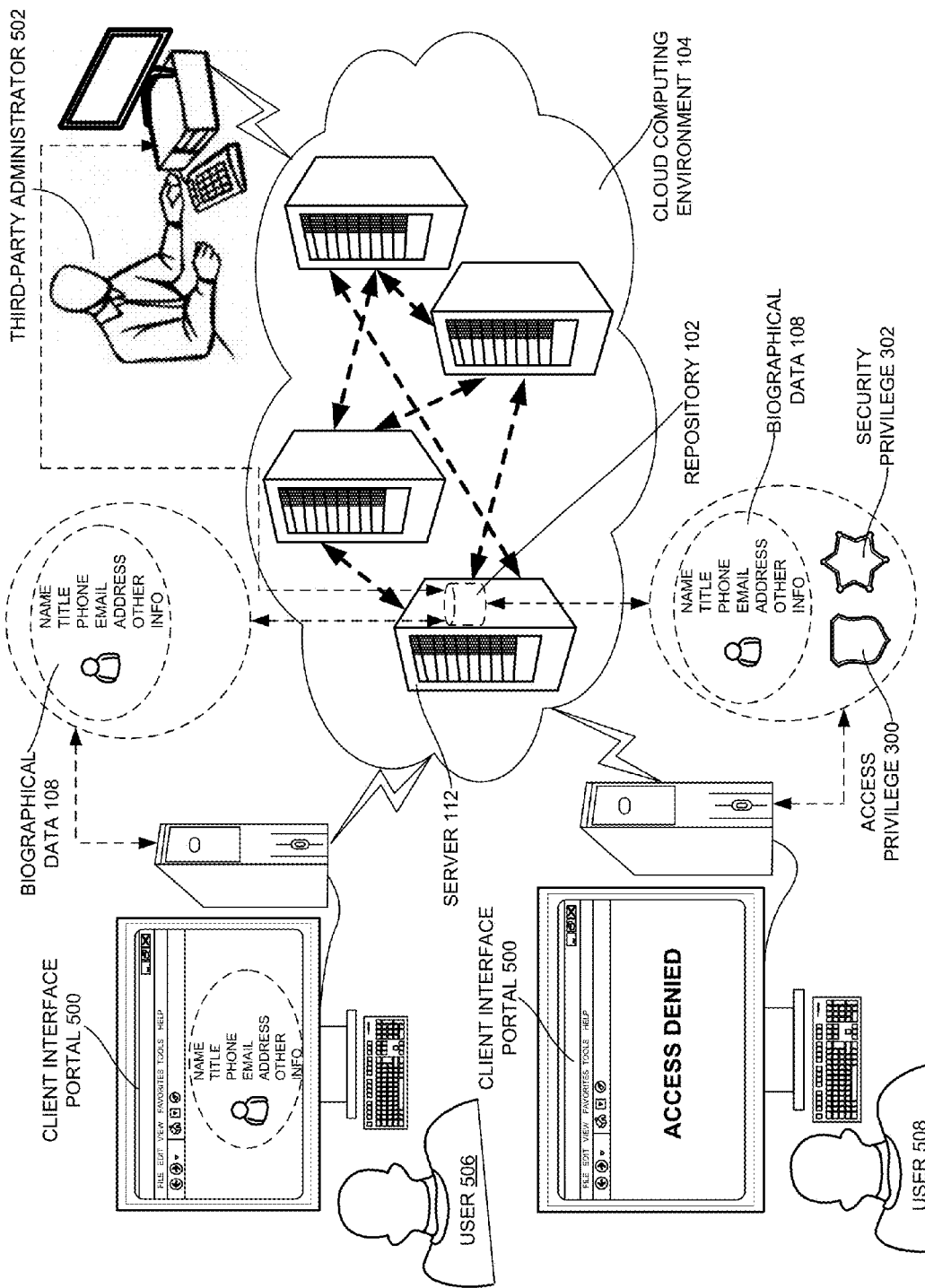
FIG. 5 illustrates the client devices of FIG. 1 accessing the data stored in the repository through a client interface portal, according to one embodiment.

Reference is now made to FIG. 5, which illustrates the client devices 114 of FIG. 1 accessing the biographical data 108 stored in the repository 102 through a client interface portal 500, according to one or more embodiments. In one exemplary embodiment, the method described heretofore also includes the portal interface module 308 generating the client interface portal 500 to allow a user of at least one of the client devices 114 to access the biographical data 108 and/or the submitted biographical data 204 stored in the repository 102. In this embodiment, the client interface portal 500 may be a web browser, a web portal, a mobile application, a mobile portal, and/or a server portal displayed through a display unit of one of the client devices 114. Moreover, the access privilege 300 and/or the security privilege 302 may be assigned by a third-party administrator 502.

In one exemplary scenario depicted in FIG. 5, a user 506 logs in to the client interface portal 500 and queries the repository 102 of the cloud computing environment 104 using one of the client devices 114. In this exemplary scenario, the third-party administrator 502 has not assigned an access privilege 300 or a security privilege 302 to the biographical data 108 and the user 506 is able to gain access to the biographical data 108 without paying a fee to access this information.

In the other exemplary scenario depicted in FIG. 5, a user 508 logs in to the client interface portal 500 and queries the repository 102 of the cloud computing environment 104 using one of the client devices 114. In this exemplary scenario, the third-party administrator 502 has assigned both the access privilege 300 and the security privilege 302 to the biographical data 108 and the user 506 is unable to gain access to the biographical data 108 without paying a fee to access this information. Under this scenario, the third-party administrator 502 may have assigned the biographical information 108 with the access privilege 300 of "paid premium" and the security privilege 302 of "high sensitivity." In this instance, the user 508 may submit a fee to gain the necessary access privilege 300 and may submit certain additional information to meet the security threshold set by the third-party administrator 502.

Reference is now made to FIG. 6, which illustrates the various types of digital identifiers that can be used as the digital identifier of FIG. 1, according to one or more embodiments. In one or more embodiments, the digital identifier may be a QR code 600, a scan code 602, a bar code 604, a graphic code 606, and a matrix code 608. In one embodiment, the QR code 600 may be scanned using the methods described herein and using the optical capture device 110 of FIG. 1. In one embodiment, the scan code 602 may be a PostNet barcode (made popular by the United States Postal Service) comprising of evenly spaced bars of two different heights. The scan code 602 may be represented by a series of five bars, two tall and three short.

In one embodiment, the barcode 604 is Code 39 defined in the American National Standards Institute (ANSI) standard as USD-3 and 3 of 9. In this embodiment, the bar code 605 comprises the digits 0 through 9, the letters A through Z, and various punctuation and symbols. The bar code may be of any length and each character of the code consists of 9 elements, 5 bars and 4 spaces. Such characters may be separated by an inter-character gap which may be the same width as a narrow bar. In another embodiment, the bar code 604 is an extended Code 39 which include additional characters that are not normally part of the Code 39 character set (e.g., lower case characters and additional symbols). In yet another embodiment, the bar code 604 is a code complying by the standards of Code 128. Under this standard, the bar code 604 may comprise the digits 0 through 9, the letters A through Z, and all standard ASCII symbols. The character of the code consists of 3 bars and 3 spaces and the bars may use an even number of elements and the spaces may use an odd number. In addition, the bar code 604 under this standard may comprise a Modulo 103 checksum.

In one embodiment, the graphic code 606 may be the QR code 600 embedding a graphic placed in the middle of the coding region. In this embodiment, the graphic may be a logo, a sign, a trademark, a service mark, and/or an identification mark. The size of the graphic may be up to one-third (⅓) the size of the edge-wise length of the QR code. The information stored in the graphic code 606 may contain redundancies so partially covered or destroyed codes can be scanned correctly.

In another embodiment, the graphic code 606 may be a fixed-size MaxiCode comprising a central bulls-eye locator and offset rows of hexagonal elements. Under this embodiment, the graphic code 606 may be capable of holding up to 93 data characters and may be read using a 2-D laser scanner. In yet another embodiment, the graphic code 606 may be a two-dimensional bar code complying by the PDF-417 standard. The PDF-417 may store up to 1,800 printable ASCII characters or 1,100 binary characters per symbol. The symbol may be rectangular and the shape of the symbol may be adjusted to some extent by setting the width and allowing the height to expand with the data. It may also be possible to segment large amounts of data into several PDF-147 symbols which may be logically linked. Under this standard, the graphic code 606 may be scanned by a laser scanner or a standard charge-coupled device (CCD) or camera reader and software to decode the scan pattern.

In one embodiment, the matrix code 608 is a two-dimensional code which can store up to 2,000 characters. The code may be in the shape of a square and may store up to 500 numeric characters and 20 ASCII characters. The matrix code 608 may be recognized using a 2-D scanning laser and/or a standard CCD camera reader.

Figure 7:
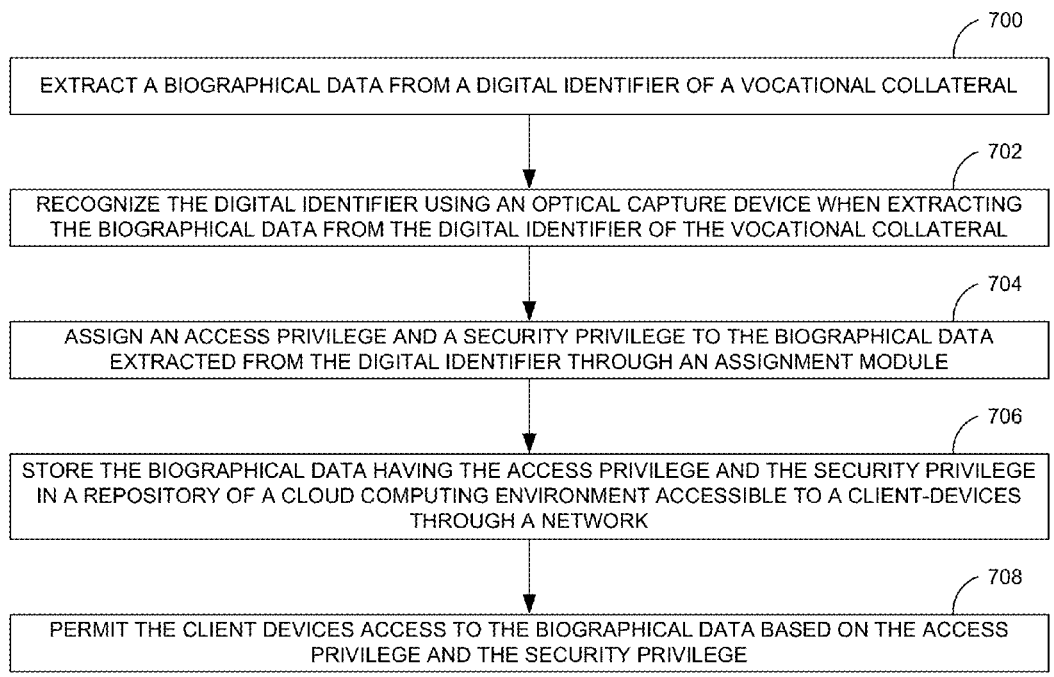
FIG. 7 is a flow chart illustrating the method of permitting client device access to a biographical data extracted from a digital identifier of the vocational collateral of FIG. 1, according to one embodiment.

Reference is now made to FIG. 7, which illustrates an exemplary set of operations permitting client device access to biographical data extracted from a digital identifier of the vocational collateral of FIG. 1. In one or more embodiments, operation 700 may involve the server 112 extracting the biographical data 108 from the digital identifier 100 through the optical capture device 110. Operation 702 may involve extracting the biographical data 109 from the digital identifier 100 of the vocational collateral 106 by recognizing the digital identifier 100 using the optical capture device 110. In one or more embodiments, operation 704 may involve the server 112 assigning the access privilege 300 and the security privilege 302 to the biographical data 108 extracted from the digital identifier 100 through the assignment module 306. Operation 706 may then include storing the biographical data 108 having the access privilege 300 and the security privilege 302 in the repository 102 of the cloud computing environment 104 accessible to the client devices 114 through a network. In one or more embodiments, operation 708 may involve the server 112 permitting the client devices 114 access to the biographical data 108 based on the access privilege 300 and the security privilege 302.

Figure 8:
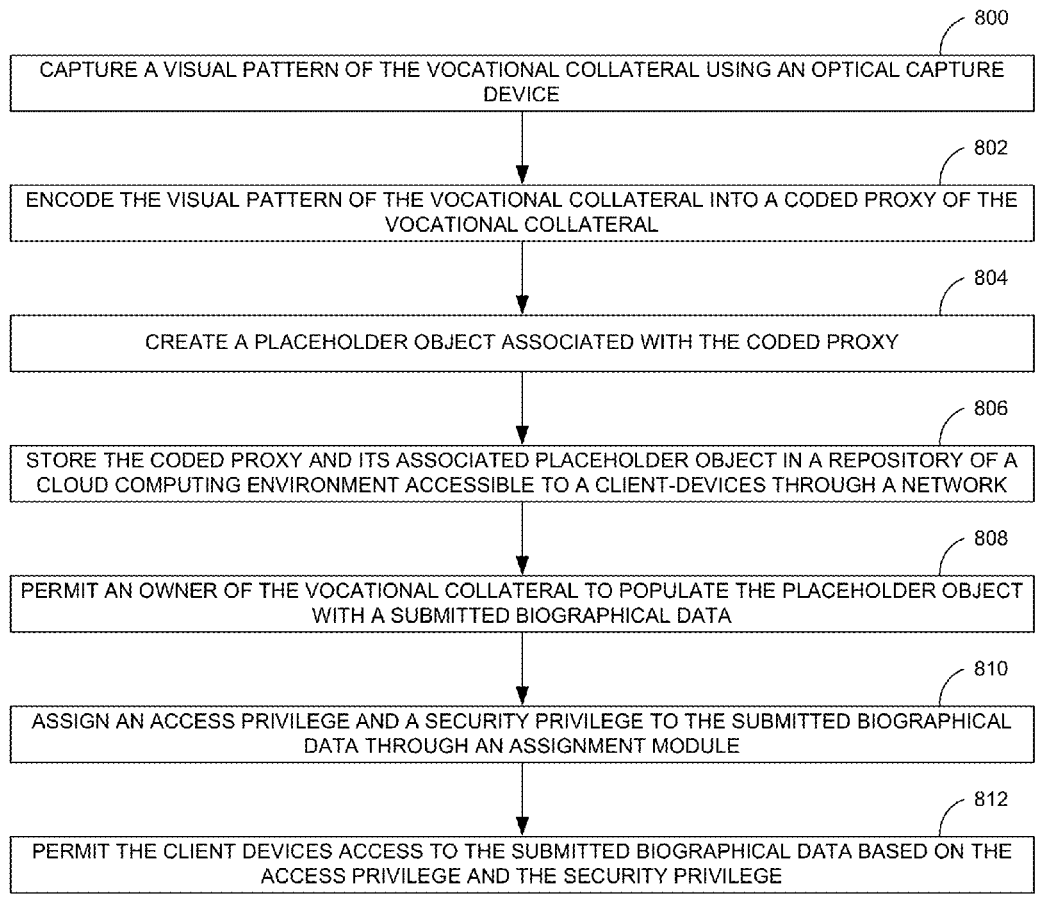
FIG. 8 is a flow chart illustrating the method of permitting client device access to a submitted biographical data associated with a captured visual pattern of the vocational collateral of FIG. 2, according to one embodiment.

Reference is now made to FIG. 8, which illustrates an exemplary set of operations permitting the client devices access to a submitted biographical data associated with a captured visual pattern of the vocational collateral of FIG. 2. In one or more embodiments, operation 800 may involve capturing the visual pattern 202 of the vocational collateral 106 using the optical capture device 110. In addition, operation 802 may involve encoding the visual pattern 202 of the vocational collateral 106 into the coded proxy 200 of the vocational collateral 106. In one or embodiments, operation 804 may then involve creating the placeholder object 206 associated with the coded proxy 200 and operation 806 may involve storing the coded proxy 200 and its associated placeholder object 206 in the repository 102 of the cloud computing environment 104 accessible to the client devices 114 through a network. Furthermore, operation 808 may include permitting an owner of the vocational collateral 106 to populate the placeholder object 206 with the submitted biographical data 204. In one or more embodiments, operation 810 may involve assigning the access privilege 300 and the security privilege 302 to the submitted biographical data 204 through the assignment module 306. Finally, operation 812 may include permitting the client devices 114 access to the submitted biographical data 204 based on the access privilege 300 and the security privilege 302.

Figure 9:
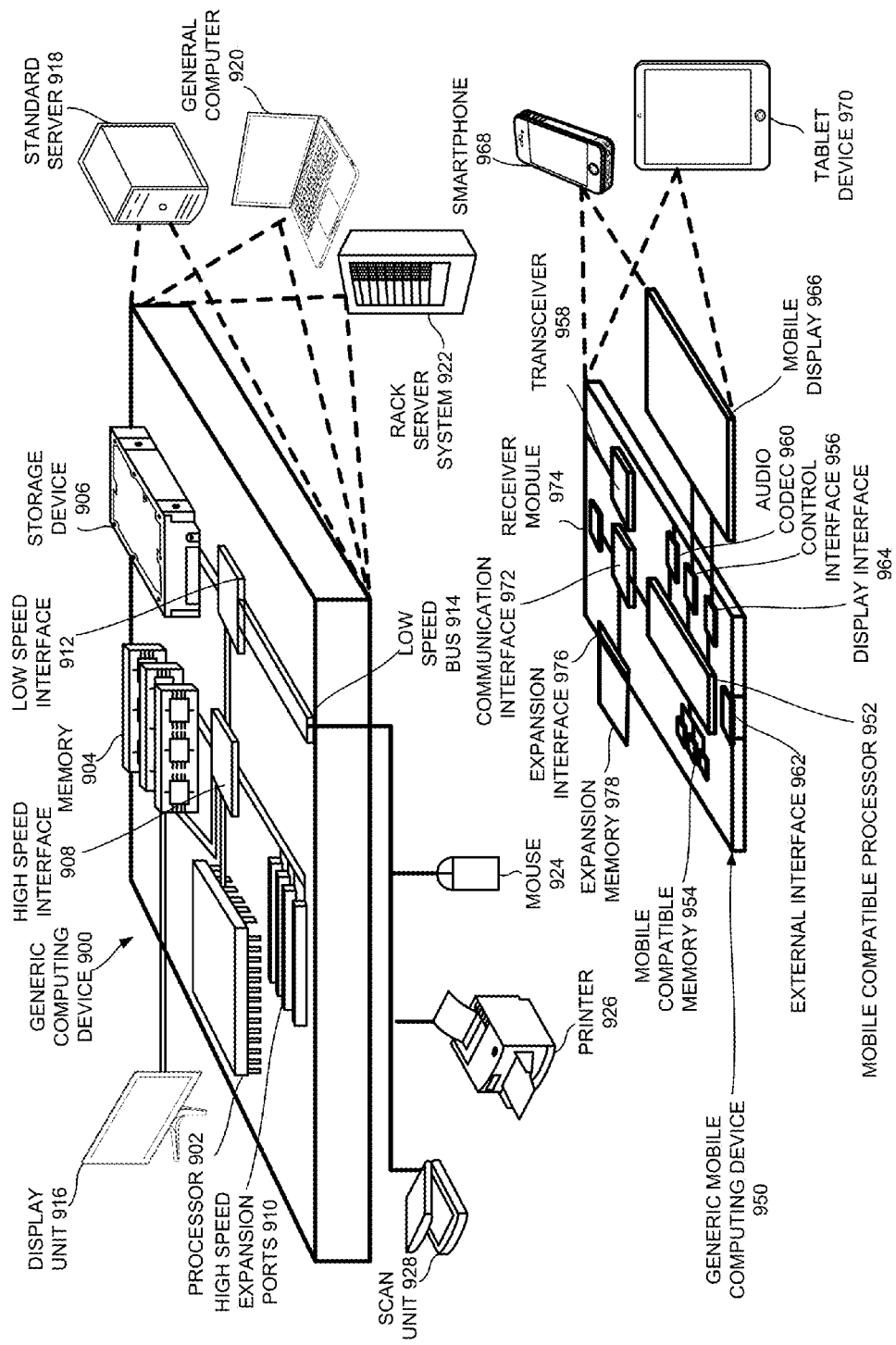
FIG. 9 is a schematic of a generic computing device and a generic mobile computing device that can be used to perform and/or implement any of the embodiments disclosed herein, according to one embodiment.

FIG. 9 is a schematic of a generic computing device 900 and a generic mobile computing device 950 that can be used to perform and/or implement any of the embodiments disclosed herein. In one or more embodiments, the optical capture device 110 comprises certain of the features of the generic mobile computing device 950 and the server 112 comprises certain of the features of the generic computing device 900.

The generic computing device 900 may represent various forms of digital computers, such as laptops, desktops, workstations, personal digital assistants, servers, blade servers, mainframes, and/or other appropriate computers. The generic mobile computing device 950 may represent various forms of mobile devices, such as smartphones, camera phones, personal digital assistants, cellular telephones, and other similar generic mobile computing devices. The components shown here, their connections, couples, and relationships, and their functions, are meant to be exemplary only, and are not meant to limit the embodiments described and/or claimed.

The generic computing device 900 may include a processor 902, a memory 904, a storage device 906, a high speed interface 908 coupled to the memory 904 and a plurality of high speed expansion ports 910, and a low speed interface 912 coupled to a low speed bus 914 and a storage device 906. In one embodiment, each of the components heretofore may be inter-coupled using various buses, and may be mounted on a common motherboard and/or in other manners as appropriate. The processor 902 may process instructions for execution in the generic computing device 900, including instructions stored in the memory 904 and/or on the storage device 906 to display a graphical information for a GUI on an external input/output device, such as a display unit 916 coupled to the high speed interface 908. In other embodiments, multiple processors and/or multiple buses may be used, as appropriate, along with multiple memories and/or types of memory. Also, a plurality of generic computing devices 900 may be coupled with, with each device providing portions of the necessary operations (e.g., as a server bank, a group of blade servers, and/or a multi-processor system).

The memory 904 may be coupled to the generic computing device 900. In one embodiment, the memory 904 may be a volatile memory. In another embodiment, the memory 904 may be a non-volatile memory. The memory 904 may also be another form of computer-readable medium, such as a magnetic and/or an optical disk. The storage device 906 may be capable of providing mass storage for the generic computing device 900. In one embodiment, the storage device 906 may be comprised of at least one of a floppy disk device, a hard disk device, an optical disk device, a tape device, a flash memory and/or other similar solid state memory device. In another embodiment, the storage device 906 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in at least one of the memory 904, the storage device 906, a memory coupled to the processor 902, and/or a propagated signal.

The high speed interface 908 may manage bandwidth-intensive operations for the generic computing device 900, while the low speed interface 912 may manage lower bandwidth-intensive operations. Such allocation of functions is exemplary only. In one embodiment, the high-speed interface 908 may be coupled to at least one of the memory 904, the display unit 916 (e.g., through a graphics processor and/or an accelerator), and to the plurality of high speed expansion ports 910, which may accept various expansion cards. In the embodiment, the low speed interface 912 may be coupled to at least one of the storage device 906 and the low-speed bus 914. The low speed bus 914 may be comprised of a wired and/or wireless communication port (e.g., a Universal Serial Bus ("USB"), a Bluetooth® port, an Ethernet port, and/or a wireless Ethernet port). The low speed bus 914 may also be coupled to at least one of scan unit 928, a printer 926, a keyboard, a mouse 924, and a networking device (e.g., a switch and/or a router) through a network adapter.

The generic computing device 900 may be implemented in a number of different forms, as shown in the figure. In one embodiment, the generic computing device 900 may be implemented as a standard server 920 and/or a group of such servers. In another embodiment, the generic computing device 900 may be implemented as part of a rack server system 922. In yet another embodiment, the generic computing device 900 may be implemented as a general computer 920 such as a laptop computer. Alternatively, a component from the generic computing device 900 may be combined with another component in a generic mobile computing device 950. In one or more embodiments, an entire system may be made up of a plurality of generic computing devices 900 and/or a plurality of generic computing devices 900 coupled to a plurality of generic mobile computing devices 950.

In one embodiment, the generic mobile computing device 950 may comprise at least one of a mobile compatible processor 952, a mobile compatible memory 954, and an input/output device such as a mobile display 966, a communication interface 972, and a transceiver 958, among other components. The generic mobile computing device 950 may also be provided with a storage device, such as a microdrive or other device, to provide additional storage. In one embodiment, at least one of the components indicated heretofore are intercoupled using various buses, and several of the components may be mounted on a common motherboard.

The mobile compatible processor 952 may execute instructions in the generic mobile computing device 950, including instructions stored in the mobile compatible memory 954. The mobile compatible processor 952 may be implemented as a chipset of chips that include separate and multiple analog and digital processors. The mobile compatible processor 952 may provide, for example, for coordination of the other components of the generic mobile computing device 950, such as control of user interfaces, applications run by the generic mobile computing device 950, and wireless communication by the generic mobile computing device 950.

The mobile compatible processor 952 may communicate with a user through the control interface 956 and the display interface 964 coupled to a mobile display 966. In one embodiment, the mobile display 966 may be at least one of a Thin-Film-Transistor Liquid Crystal Display ("TFT LCD"), an Organic Light Emitting Diode ("OLED") display, and another appropriate display technology. The display interface 964 may comprise appropriate circuitry for driving the mobile display 966 to present graphical and other information to a user. The control interface 956 may receive commands from a user and convert them for submission to the mobile compatible processor 952. In addition, an external interface 962 may be provide in communication with the mobile compatible processor 952, so as to enable near area communication of the generic mobile computing device 950 with other devices. External interface 962 may provide, for example, for wired communication in some embodiments, or for wireless communication in other embodiments, and multiple interfaces may also be used.

The mobile compatible memory 954 may be coupled to the generic mobile computing device 950. The mobile compatible memory 954 may be implemented as at least one of a volatile memory and a non-volatile memory. The expansion memory 978 may also be coupled to the generic mobile computing device 950 through the expansion interface 976, which may comprise, for example, a Single In Line Memory Module ("SIMM") card interface. The expansion memory 978 may provide extra storage space for the generic mobile computing device 950, or may also store an application or other information for the generic mobile computing device 950. Specifically, the expansion memory 978 may comprise instructions to carry out the processes described above. The expansion memory 978 may also comprise secure information. For example, the expansion memory 978 may be provided as a security module for the generic mobile computing device 950, and may be programmed with instructions that permit secure use of the generic mobile computing device 950. In addition, a secure application may be provided on the SIMM card, along with additional information, such as placing identifying information on the SIMM card in a non-hackable manner.

The mobile compatible memory 952 may comprise at least one of a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on at least one of the mobile compatible memory 954, the expansion memory 978, a memory coupled to the mobile compatible processor 952, and a propagated signal that may be received, for example, over the transceiver 958 and/or the external interface 962.

The generic mobile computing device 950 may communicate wirelessly through the communication interface 972, which may be comprised of a digital signal processing circuitry. The communication interface 972 may provide for communications using various modes and/or protocols, such as, at least one of: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the radio-frequency transceiver 958. In addition, short-range communication may occur, such as using a Bluetooth®, Wi-Fi, and/or other such transceiver. In addition, a GPS ("Global Positioning System") receiver module may provide additional navigation-related and location-related wireless data to the generic mobile computing device 950, which may be used as appropriate by a software application running on the generic mobile computing device 950.

The generic mobile computing device 950 may also communicate audibly using an audio codec 960, which may receive spoken information from a user and convert it to usable digital information. The audio codec 960 may likewise generate audible sound for a user, such as through a speaker (e.g., in a handset of the generic mobile computing device 950). Such a sound may comprise a sound from a voice telephone call, a recorded sound (e.g., a voice message, a music files, etc.) and may also include a sound generated by an application operating on the generic mobile computing device 950.

The generic mobile computing device 950 may be implemented in a number of different forms, as shown in the figure. In one embodiment, the generic mobile computing device 950 may be implemented as a smartphone 968. In another embodiment, the generic mobile computing device 950 may be implemented as a personal digital assistant ("PDA"). In yet another embodiment, the generic mobile computing device, 950 may be implemented as a tablet device 970.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal display ("LCD") monitor) for displaying information to the user and a keyboard and a mouse 924 by which the user can provide input to the computer. Other kinds of devices can be used to provide for interaction with a user as well; for example, feedback provided to the user can be any form of sensory feedback (e.g., visual feedback, auditory feedback, and/or tactile feed-back) and input from the user can be received in any form, including acoustic, speech, and/or tactile input.

The systems and techniques described here may be implemented in a computing system that comprises at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The computing system can comprise at least one of a client and a server. In one embodiment, the client and the server are remote from each other and interact through the communication network.

Disclosed is a system of segmented access of remotely stored biographical data to a client device. In one embodiment, the system comprises the optical capture device 110 to extract the biographical data 108 from the digital identifier 100 of the vocational collateral 106 and storing the biographical data 108 in the repository 102 of the cloud computing environment 104. In one embodiment, the repository 102 may be stored in the server 112 of the cloud computing environment 104. In one embodiment, the optical capture device 110 extracts the biographical data 108 from the digital identifier 100 of the vocational collateral 106. The optical capture device 110 may also extract the biographical data 108 from the digital identifier 100 of the vocational collateral 106 by recognizing the digital identifier 100 through a light emitting element and at least one of a CCD camera sensor and a CMOS camera sensor.

In one embodiment, the server 112 comprises the memory 312, the processor 314, the input/output interface 316, all coupled by the bus 322. In particular, the memory 312 may comprise the assignment module 306, the portal interface module 308, the translation module 310, and the repository 102. The server 112 may also communicate with one or more external devices including the display unit 318 and the input unit 320, both of which may be interfaced with the server through the input/output interface 316.

In one embodiment, the assignment module 306 may assign an access privilege 300 and a security privilege 302 to the biographical data 108 stored in the repository 102. The access privilege 300 may be assigned based on a criteria established by a third-party administrator 502 (see FIG. 5) and the security privilege 302 may be assigned based on a sensitivity of the biographical data 108 (see FIG. 4).

In another embodiment, the translation module 310 may translate a textual data of the vocational collateral 106 from a language other than the English language to a translated data that is the English language equivalent of the textual data. The translation module 310 may translate the textual data by delivering the textual data to a third-party server comprising a translation application programming interface (API) (e.g., Google® Translate API) and calling the results of such a translation into a memory of the server 112. In this embodiment, the assignment module 306 may assign an access privilege 300 and a security privilege 302 to the biographical data 108 stored in the repository 102.

An example will now be described in which the various embodiments will be explained in a hypothetical scenario. A hiring manager of a software company by the name of T. Cook may be participating in a career fair to recruit new programmers. A software engineer by the name of B. Gate may hand T. Cook his vocational collateral 106 (e.g., his business card) having the digital identifier 100 (e.g., a QR code). T. Cook then uses the optical capture device 110 (e.g., an iPhone® smartphone) to extract B. Gate's biographical data 108 from the digital identifier 100. B. Gate's biographical data 108 may then be delivered to the repository 102 (e.g., a database) of the cloud computing environment 104 to be stored.

The server 112 may then send an electronic message to B. Gate to submit additional information such as his current salary 406, an employer description 408, an education history 410, and/or a listing of his technical knowledge 412 to the repository 102 to be included as part of his biographical data 108. The third-party administrator 502 may then assign at least one of the access privilege 300 and the security privilege 302 to B. Gate's biographical data 108 through the assignment module 306. The third-party administrator 502 may assign an access privilege of "paid premium" to data concerning B. Gate's salary 406 and an access privilege of "paid standard" to data concerning B. Gate's technical knowledge 412. The third-party administrator 502 may also assign a security privilege of "high sensitivity" to B. Gate's salary 406 and a security privilege of "medium sensitivity" to B. Gate's technical knowledge 412.

Finally, the server 112 may grant T. Cook access to B. Gate's biographical data 108 if T. Cook meets certain requirements with regard to his access privilege 300 and his security privilege 302.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method, comprising:
   extracting, by a processor, a biographical data from a digital identifier of a vocational collateral, wherein the digital identifier is at least one of a quick response (QR) code, a scan code, a bar code, a graphic code, and a matrix code;
   determining, by the processor, an access privilege by assigning an access weight value to one or more elements of the biographical data, and calculating the access privilege based on a weighted average of the access weight value of the one or more elements;
   determining, by the processor, a security privilege by assigning a sensitivity weight value to one or more elements of the biographical data, and calculating the security privilege based on a weighted average of the sensitivity weight value of the one or more elements;
   assigning, by the processor, the access privilege and the security privilege to the biographical data extracted from the digital identifier through an assignment module;
   storing, by the processor, the biographical data having the access privilege and the security privilege in a repository of a cloud computing environment accessible to a plurality of client devices through a network connection; and
   providing, by the processor, the biographical data to the plurality of client devices based on the access privilege and the security privilege.

2. The method of claim 1, further comprising:
   recognizing the digital identifier using an optical capture device when extracting the biographical data from the digital identifier of the vocational collateral, wherein the optical capture device is at least one of a smartphone, a tablet device, a mobile telephone, a thin-client device, a QR code scanner, a bar code scanner, and a web camera.

3. The method of claim 1, further comprising:
   storing, by the processor, the biographical data having at least one of the access privilege and the security privilege in a repository of a local computing environment.

4. The method of claim 1, wherein the access weight value assigned to the one or more elements of the biographical data is based on a monetary value of the biographical data calculated using a valuing module.

5. The method of claim 1, further comprising:
   generating, by the processor, a client interface portal through a portal interface module to allow a client device access to the biographical data and an additional biographical data stored in the repository, wherein the client interface portal is at least one of a web-based portal, a server portal, and a mobile application portal.

6. The method of claim 1, further comprising:
   translating, by the processor, a textual data of the vocational collateral from a language other than the English language to a translated data that is the English language equivalent of the textual data.

7. The method of claim 1, wherein:
   the access weight value and the sensitivity weight value are assigned based on a criteria established by a third-party administrator,
   the sensitivity weight value is assigned based on a sensitivity of the one or more elements of the biographical data, and
   the biographical data comprises at least one of a name, a job title, a contact information, an employer description, a salary, an education history, a technical knowledge, a personal picture, an employment history, and a job-related data of an owner of the vocational collateral.

8. A method, comprising:
   capturing a visual pattern of the vocational collateral using an optical capture device;
   encoding, by a processor, the visual pattern of the vocational collateral into a coded proxy of the vocational collateral;
   creating, by the processor, a placeholder object associated with the coded proxy;
   storing, by the processor, the coded proxy and its associated placeholder object in a repository of a cloud computing environment accessible to a plurality of client devices through a network connection;
   populating, by the processor, the placeholder object with a biographical data;
   determining, by the processor, an access privilege by assigning an access weight value to one or more elements of the biographical data, and calculating the access privilege based on a weighted average of the access weight value of the one or more elements;
   determining, by the processor, a security privilege by assigning a sensitivity weight value to one or more elements of the biographical data, and calculating the security privilege based on a weighted average of the sensitivity weight value of the one or more elements;
   assigning, by the processor, the access privilege and the security privilege to the biographical data through an assignment module; and
   providing, by the processor, the biographical data to the plurality of client devices based on the access privilege and the security privilege.

9. The method of claim 8, further comprising:
   matching, by the processor, the coded proxy with the visual pattern of the vocational collateral when the visual pattern of the vocational collateral is captured again by the optical capture device.

10. The method of claim 8, wherein:
    the optical capture device is at least one of a smartphone, a tablet device, a mobile telephone, a thin-client device, a QR code scanner, a bar code scanner, and a web camera.

11. The method of claim 8, further comprising:
    storing, by the processor, the biographical data having at least one of the access privilege and the security privilege in a repository of a local computing environment.

12. The method of claim 8, wherein the access weight value assigned to the one or more elements of the biographical data is based on a monetary value of the biographical data calculated using a valuing module.

13. The method of claim 8, further comprising:
    generating, by the processor, a client interface portal through a portal interface module to allow a client device access to the biographical data and an additional biographical data stored in the repository, wherein the client interface portal is at least one of a web-based portal, a server portal, and a mobile application portal.

14. The method of claim 8, further comprising:

translating, by the processor, a textual data of the vocational collateral from a language other than the English language to a translated data that is the English language equivalent of the textual data through a translation module.

15. The method of claim 8, wherein:

the access weight value and the sensitivity weight value are assigned based on a criteria established by a third-party administrator, the sensitivity weight value is assigned based on a sensitivity of the one or more elements of the biographical data, and the biographical data comprises at least one of a name, a job title, a contact information, an employer description, a salary, an education history, a technical knowledge, a personal picture, an employment history, and a job-related data of an owner of the vocational collateral.

* * * * *